Figure 1:
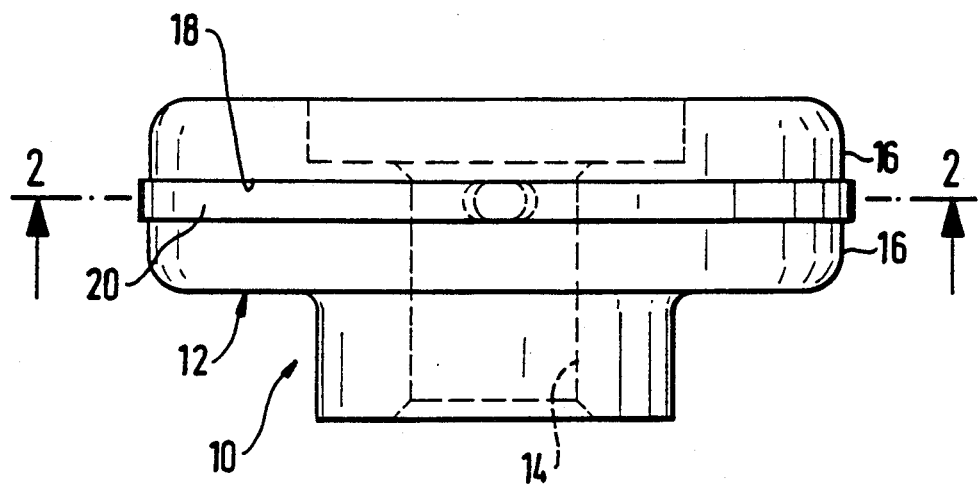

United States Patent [19]

Lautenschläger

[11] Patent Number: 5,233,725
[45] Date of Patent: Aug. 10, 1993

[54] WHEEL FOR ROLLER DRAWER GUIDES

[75] Inventor: Horst Lautenschläger, Reinheim, Fed. Rep. of Germany

[73] Assignee: Mepla-Werke Lautenschläger GmbH & Co. KG, Reinheim, Fed. Rep. of Germany

[21] Appl. No.: 878,345

[22] Filed: May 4, 1992

[30] Foreign Application Priority Data

May 3, 1991 [DE] Fed. Rep. of Germany ....... 4114454

[51] Int. Cl.$^5$ ..................... A47H 15/00; A47B 91/00; B60B 1/06; B60C 7/00
[52] U.S. Cl. ......................................... 16/107; 16/45; 152/323; 301/64.007
[58] Field of Search .................... 16/45, 107; 152/323; 301/64.7

[56] References Cited

U.S. PATENT DOCUMENTS

| 4,535,827 | 8/1985 | Seaford | 152/323 |
| 5,031,269 | 7/1991 | Lautenschlager | 16/107 |

FOREIGN PATENT DOCUMENTS

| 7129122 | 7/1971 | Fed. Rep. of Germany . |
| 2232752 | 1/1974 | Fed. Rep. of Germany . |
| 2548536 | 5/1979 | Fed. Rep. of Germany . |
| 3201994 | 9/1982 | Fed. Rep. of Germany . |
| 8506360 | 7/1985 | Fed. Rep. of Germany . |
| 8522387 | 10/1985 | Fed. Rep. of Germany . |
| 3521860 | 1/1987 | Fed. Rep. of Germany . |

Primary Examiner—John Sipos
Assistant Examiner—Carmine Cuda

[57] ABSTRACT

Wheel (10) for roller drawer guides, whose body (12) made of a hard plastic of stable shape journaled on a wheel axle has a circumferential groove (18) in its rim, in which there is disposed a tire (20) of resiliently deformable material, preferably elastomeric plastic, anchored in at least one bore or opening (22) in the wheel body and slightly proud of the rim (16) of the wheel. The at least one bore or opening is configured as a through-bore (22) running radially from the bottom of the groove (18) to the surface of the journal bore (14) in the wheel body (12).

9 Claims, 2 Drawing Sheets

WHEEL FOR ROLLER DRAWER GUIDES

The invention relates to a wheel for rolling guides for drawers and other such furniture parts, whose wheel bodies journaled on a shaft and made of a shape-stable, hard plastic have a circumferential groove in their rim surface in which there is disposed a tire of resiliently deformable material, preferably elastomeric plastic, anchored in at least one bore or opening in the wheel body and projecting slightly above the rim of the wheel.

In drawer guides which are equipped with wheels having a tire of resiliently deformable material (DE-GM 71 29 122) the tires serve to dampen the rolling noise occurring when the wheel rims roll on the guide rails and runner rails of the drawer guide. To prevent the resiliently deformable tires from assuming a permanent deformation in the course of time due to the pressure of the weight of the drawer, it has been found desirable to relieve the tires of the load by providing a matching shape in the track surfaces of the guide rails and/or runner rails in the areas associated with the end position of the wheels (DE-OS 35 21 860). In known tires, the tires are constituted, for example, by rubber rings disposed in circumferential grooves in the wheels. It has also been found that these resilient tires—especially in the case of heavily loaded wheels—tend to spread in the course of time, creating the danger that they might escape from the grooves.

Wheels of the kind mentioned above have therefore been developed (DE-GM 85 22 387) in which the tire of resiliently deformable material consists of elastomeric plastic placed in the wheel body by the injection molding process, and fills up not only the circumferential groove, but also fills bores running parallel to the wheel's axis of rotation and opening into the groove and thus becomes anchored therein. The injection molding dies designed for the production of the wheel body and containing the plastic material which sets elastomerically when it is injected are, however, relatively complex because, for example, pin-like plungers must be provided for the production of bores in the wheel body parallel to the axis of rotation, and when the resilient plastic is injected the assurance must be provided that the material bonding with the elastomer must at least partially fill the axis-parallel bores.

The invention is addressed to the problem of creating a noise-reducing wheel for roller drawer guides which provides the desired noise reduction when rolling in the runner and guide rails and reliably holds the tires in the corresponding groove in the wheel body even when the drawer guides are heavily loaded, and of reducing the cost of the manufacture of the wheel in successive injection molding procedures for making the wheel bodies and the tires by simplifying the injection molding dies.

Setting out from a wheel of the kind described above, this problem is solved according to the invention in that the at least one bore or opening is a through-bore which runs radially from the bottom of the groove to the surface of the journal bore in the wheel body which accommodates the wheel axle.

The radial course of the through-bore makes it possible to provide the injection molding die for the wheel body with a solid, pin-like projection to form the through-bore, insofar as the plane of separation of the die halves is disposed at right angles to this pin-like projection and thus to the through-bore formed in the wheel body. The radial through-bore simultaneously serves as a gate for the elastomerically setting plastic material to be injected into the wheel body in the second step, and anchors the tire in the wheel body.

In an advantageous further development of the invention, two diametrically opposite radial through-bores are provided in line with one another in the wheel body, and are formed during the injection molding of the wheel body by pin-like, stiff projections provided in each die half.

The width of the through-bores measured parallel to the wheel axle is preferably equal to the width of the groove accommodating the resilient tire so that, when the elastomerically setting plastic is injected, there will be no interference with its flow at the transition between the radial through-bore and the bottom of the groove.

The bottom of the groove can in the simplest case have a circular shape in lateral projection, and the tire of the finished wheel will then have a uniform radial thickness as seen in the circumferential direction.

Alternatively, however, the configuration can be made such that the bottom of the circumferential groove will have in lateral projection an unround, preferably polygonal shape. The tire will then vary its radial thickness, as seen in the circumferential direction, according to the varying depth of the groove and will in this manner be additionally anchored in the groove.

The anchoring of the tire in the wheel body can be made still more secure by providing, parallel to the radially disposed through-bore or bores, at least one additional through-bore filled with the elastic material of the tire, which passes through the wheel body laterally beside the journal bore and opens at both ends in the bottom of the groove, the configuration being made preferably such that two additional through-bores are provided each on opposite sides of the journal bore and extend through the wheel body.

Figure 2:
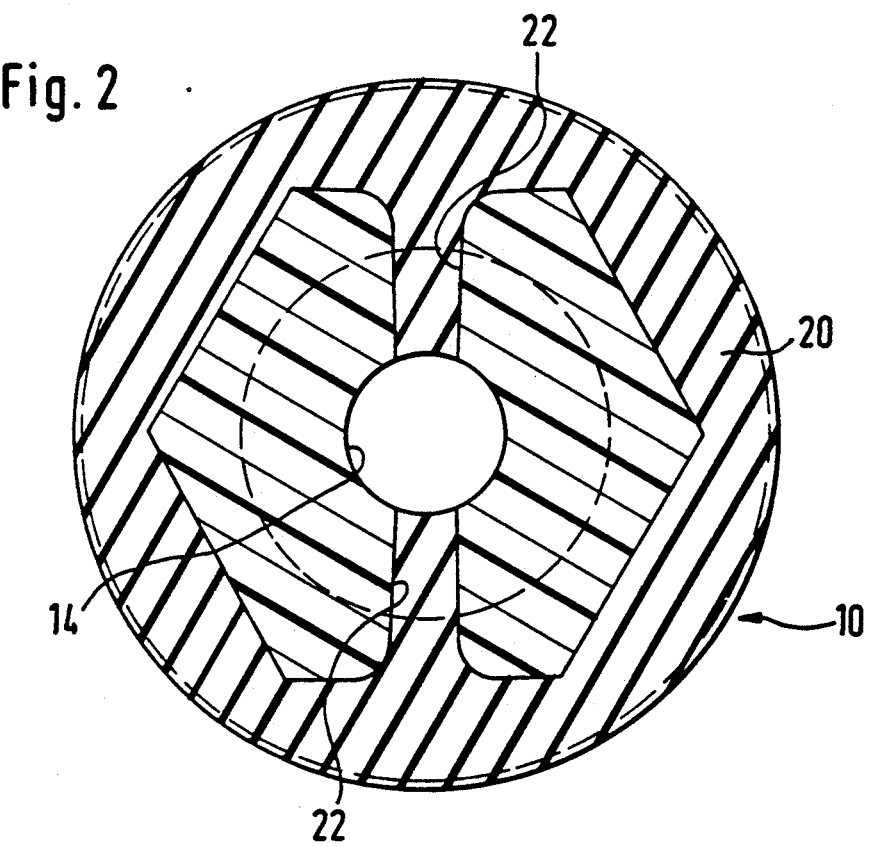
Figure 3:
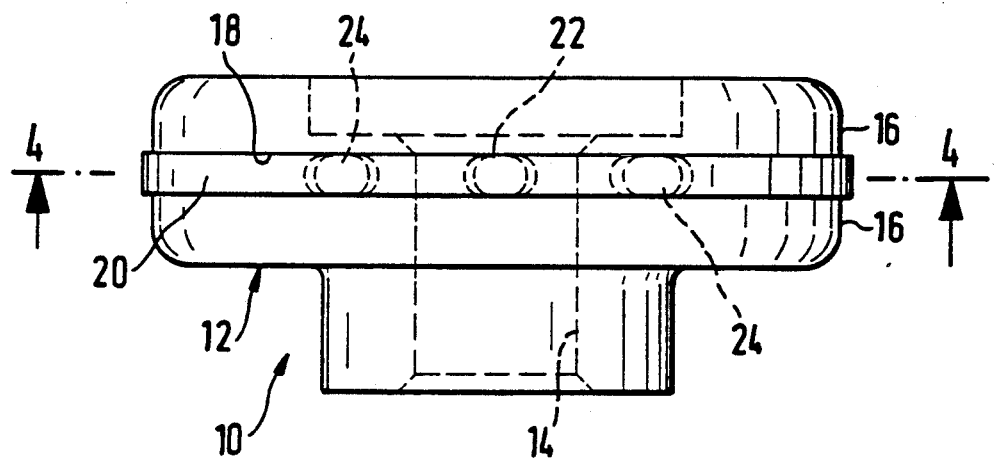
Figure 4:
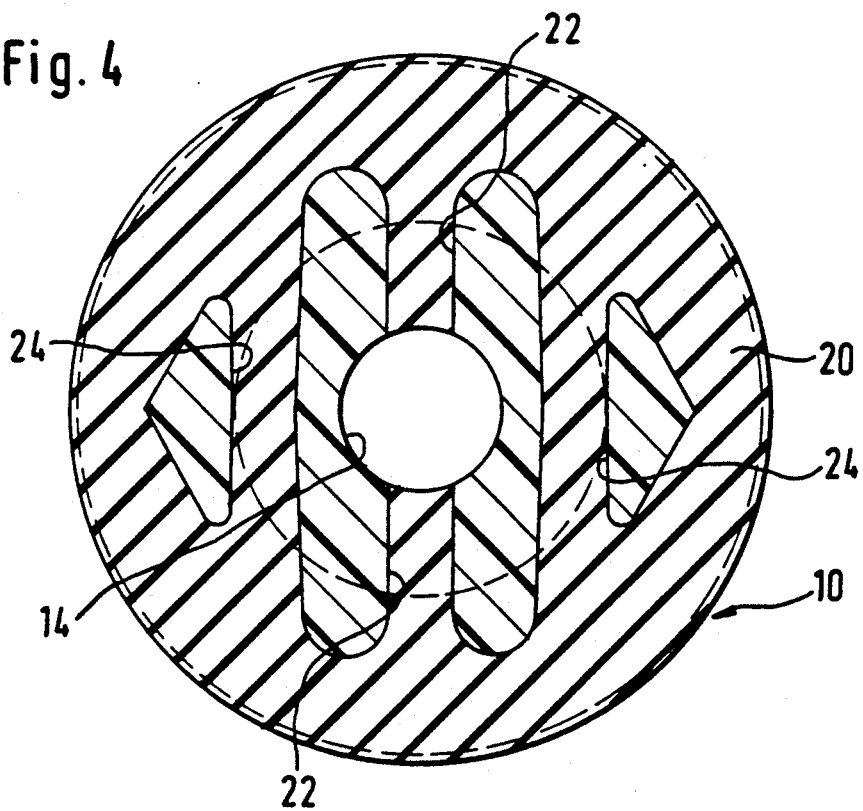

The invention will be explained further in the following description of two embodiments in conjunction with the drawing, wherein:

FIG. 1 is an elevational view of the rim of a first embodiment of a wheel formed in the manner of the invention, FIG. 2 is a sectional view through the wheel seen in the direction of the arrows 2—2 in FIG. 1, FIG. 3 is a view corresponding to FIG. 1 of a second embodiment of a wheel according to the invention, and FIG. 4 is a sectional view through the wheel seen in the direction of the arrows 4—4 in FIG. 3.

The wheel shown in FIGS. 1 and 2 and identified as a whole by 10 has a rigid body 12 made by injection molding from an appropriate plastic. It has the shape of a relatively thick circular disk and is provided with a central bore 14 which forms the journal for the rotatable mounting of the wheel body 12 on a journal pin (not shown) fastened to the runner rail or guide rail of a drawer guide. In the rim 16 of the circular disk of the wheel body 12, formed by its circumferential surface, there is provided a circumferential groove 18 which is filled with a tire 20 of a resiliently deformable material—preferably an elastomeric plastic. This tire 20 is slightly proud of the rim 16 of the wheel body 12 in the radial direction, so that the weight of a drawer mounted in a cabinet carcase on drawer guides provided with wheels 10, will be transferred primarily through the projecting portion of the tire 20 to the associated limb of the profile of runner rail or guide rail of the drawer guide. Due to the elastic deformability of the material of the tire, the latter will deform elastically to a greater or lesser extent, depending on the weight of the drawer, so that if this weight is very great the protruding portion of the tire 20 will be depressed into the groove 18 in the area of stress and then a portion of the weight will be transferred through the hard rim 16 of the wheel to the associated runner rail or guide rail.

Setting the tire 20 into the wheel body 12 such that it not only completely fills the groove 18 but also protrudes in the described manner radially above the rim 16 is performed by injecting the material for the tire in a liquid state through two (in the illustrated case) through-bores 22 which run in alignment with one another radially from the central bore 14 to the bottom of the groove 18 in the wheel body 12. The wheel body 12 is held during this procedure in a mold surrounding it on all sides, in which a groove is formed in the area of the rim, into which the injected material enters and thus forms the annular portion radially rising above the rim 16.

The material of the tire is either a thermoplastic in the eheated state which has the desired resilience after cooling, or a plastic prepared from two liquid components immediately prior to injection and then solidifying in the elastomeric state by chemical reactions of the two components, this chemical reaction (e.g., polycondensation) being able to be accelerated by the input of heat through the heated mold.

The material of the tire 20 injected by means of an appropriately designed injection nozzle introduced into the central bore 14 and through the through-bore 22 into the circumferential groove 18 fills not only the groove 18 but also the through-bore 22, thereby assuring the necessary anchoring of the tire 20 against rotation relative to the wheel body 12. Furthermore, in the case represented, the depth of the circumferential groove is not equal in the circumferential direction. Instead, the body of the groove in the embodiment represented has the hexagonal shape that can be seen in the lateral projection in FIG. 2. In this manner also, the tire 20 is anchored in the groove 18 in the direction of wheel rotation.

The wheel shown in FIGS. 3 and 4 corresponds largely to the tire 10 described above in connection with FIGS. 1 and 2, and equal parts of the two tires are given the same reference numbers in the drawing, so that it will suffice to explain only the differences, while otherwise the preceding description can be consulted. The essential improvement made for the still better anchoring of the tire in the wheel body concerns the formation of two additional through-bores 24 offset laterally parallel to the radial through-bores 22 and passing through the wheel body 12 on opposite sides of the journal bore 14, which are filled with the resiliently setting plastic when the wheel body is injected and are integral with the tire 20.

It is apparent that modifications and further developments of the embodiments described and illustrated can be made within the scope of the idea of the invention, relating to the possibility of an additional shaping of the profile of the lateral walls of the groove 18 or a different shape of the bottom of this groove. In the preferred one-piece production of the roller body care need only be taken to see that such additional profile modifications or shaping of the bottom will not interfere with the opening of the halves of the mold, i.e., will not require any additional ejectors. If the body of the wheel, however—which is, of course, also possible—is assembled from two separately made halves, whose plane of separation then runs, for example, at right angles to the axis of rotation of the wheel, consideration can be given to different, e.g. radial, dispositions of the through-bores 22 or additional profiles in the lateral walls of the groove 18.

I claim:

1. Wheel for roller guides for drawers and other such drawable furniture parts, whose wheel body is journaled on a wheel axle and made from a hard plastic of stable shape has a circumferential groove in the tread surface, in which there is disposed a tire of elastically deformable material projecting slightly above the tread surface of the wheel and anchored in at least one bore or opening in the wheel body, wherein the at least one bore or opening is configured as a through-bore which extends radially from the bottom of the groove to the surface of the journal bore receiving the wheel axle in the wheel body.

2. Wheel according to claim 1, wherein two radial through-bores diametrically opposite one another and in alignment are provided.

3. Wheel according to claim 1, wherein the through-bores in their width measured parallel to the wheel's axis of rotation are approximately equal to the width of the groove receiving the resilient tire.

4. Wheel according to claim 1, wherein the bottom of the groove has in lateral projection a circular shape.

5. Wheel according to claim 1, wherein the tire is made of elastomeric plastic.

6. Wheel according to claim 1, wherein parallel to the radially disposed through-bore or through-bores, at least one additional through-bore filled with the resilient material of the tire is provided, which passes through the wheel body laterally beside the journal bore and opens at both ends in the bottom of the groove.

7. Wheel according to claim 6, wherein two additional through-bores extending through the wheel body are provided one on each opposite side of the journal bore.

8. Wheel according to claim 1, wherein the bottom of the groove has, in lateral projection, an unround shape.

9. Wheel according to claim 8, wherein the bottom of the groove has, in lateral projection, a polygonal shape.

* * * * *